United States Patent [19]

Bailey

[11] Patent Number: 4,572,850
[45] Date of Patent: Feb. 25, 1986

[54] METHOD AND APPARATUS FOR DIP COATING FOAM PATTERNS

[75] Inventor: Francis V. Bailey, Racine, Wis.

[73] Assignee: Outboard Marine Corporation, Waukegan, Ill.

[21] Appl. No.: 699,485

[22] Filed: Feb. 7, 1985

Related U.S. Application Data

[63] Continuation of Ser. No. 624,231, Jun. 25, 1984, abandoned.

[51] Int. Cl.$^4$ .............................................. B05D 1/18
[52] U.S. Cl. .................................. 427/430.1; 118/500; 269/254 R
[58] Field of Search ...................... 427/430.1; 118/500, 118/503, 504; 269/46, 22, 254 R

[56] References Cited

U.S. PATENT DOCUMENTS

| | | | |
|---|---|---|---|
| 1,613,375 | 1/1927 | Berkley | 118/503 X |
| 2,534,338 | 12/1950 | Caroselli | 41/9 |
| 2,740,375 | 4/1956 | Diehl et al. | 118/503 X |
| 3,324,827 | 6/1967 | Powell et al. | 118/503 X |
| 3,414,502 | 12/1968 | Porrata et al. | 204/281 |
| 3,848,564 | 11/1974 | Kull | 118/504 X |
| 4,286,542 | 9/1981 | Belcher et al. | 118/500 |

*Primary Examiner*—Shrive P. Beck
*Attorney, Agent, or Firm*—Michael, Best & Friedrich

[57] ABSTRACT

An apparatus for supporting objects of varied shapes for submersion in a liquid, the apparatus comprising a pair of sheets of elastomeric material, each of the sheets having a perimeter, and a frame for supporting at least a portion of the perimeters of the sheets in generally parallel spaced-apart position such that the sheets will hold an object placed therebetween.

19 Claims, 4 Drawing Figures

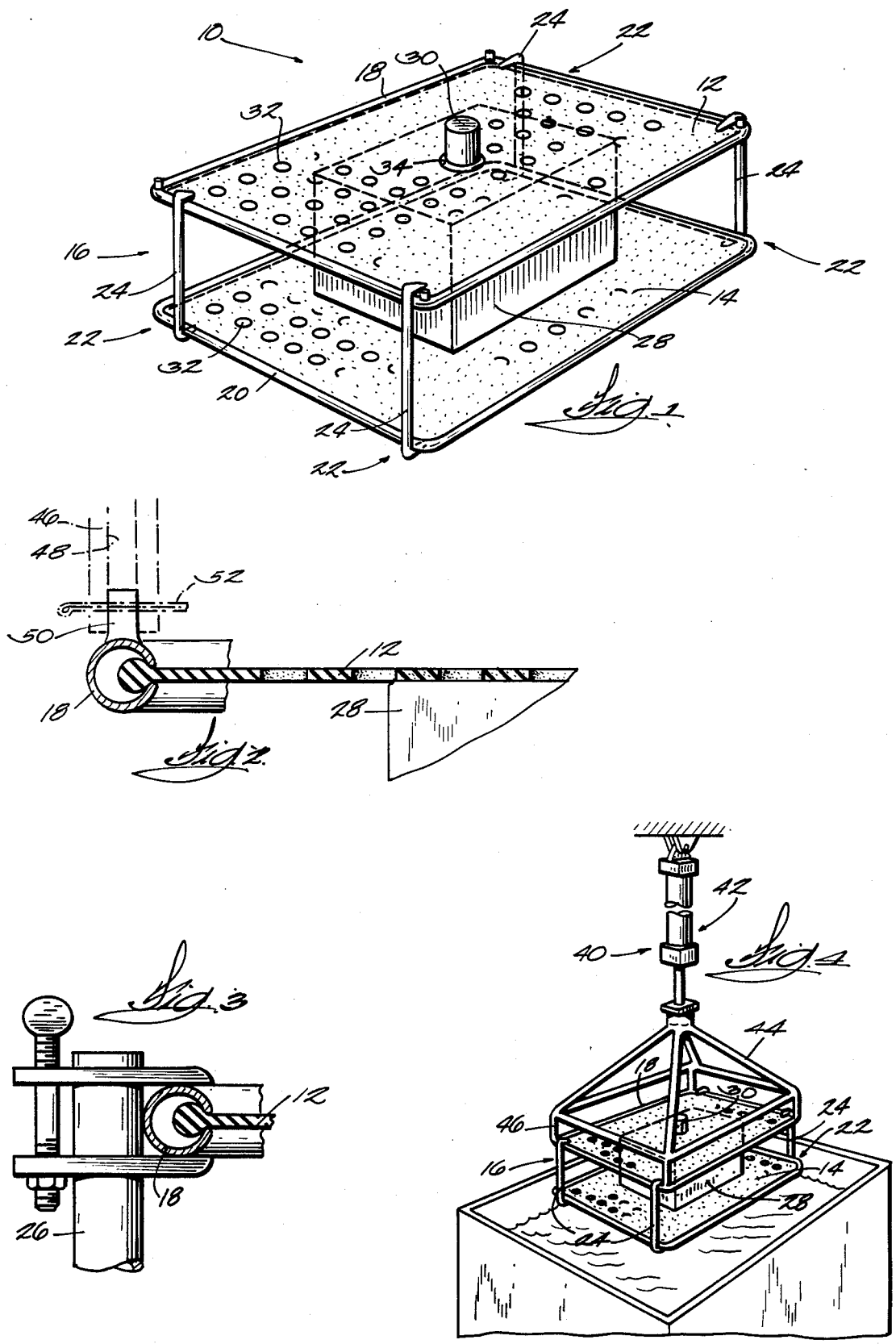

METHOD AND APPARATUS FOR DIP COATING FOAM PATTERNS

This application is a continuation of Ser. No. 624,231, filed 6/25/84 and now abandoned.

BACKGROUND OF THE INVENTION

This invention relates to apparatus for supporting objects of varied shapes for submersion in a liquid, and, more particularly, apparatus for supporting for dip coating foam mold patterns used in a lost foam casting process.

One method of applying a refractory coating to a foam mold pattern is to dip the foam pattern in a refractory coating liquid. This method is often quicker and more efficient than other known methods of applying a refractory coating. However, this method presents a problem in that the foam pattern has a very low density relative to the density of the refractory coating liquid, and therefore the liquid can exert a large buoyant force on the foam pattern. As a result, a substantial force is required to submerge the foam pattern in the refractory coating liquid. Furthermore, the pattern is relatively heavy once it has been coated, and a substantial force is required to lift it from the refractory coating liquid.

Since most foam patterns, and especially those with runner systems, are relatively flimsy, it is desirable, in order to prevent distortion or denting of the pattern, to distribute the stress of the submerging and lifting forces across the pattern as evenly as possible. One way to evenly distribute the stress across the pattern is to provide a rigid fixture that is specially shaped to distribute stress across the particular pattern. Such a rigid fixture is generally usable for only one type of mold pattern, and could not be used for a mold pattern of a different shape. Furthermore, such rigid fixtures are expensive and difficult to build and maintain.

Attention is directed to the following U.S. patents:

Belcher U.S. Pat. No. 4,286,542, issued Sept. 1, 1981;
Porrata U.S. Pat. No. 3,414,502, issued Dec. 31, 1968; and
Caroselli U.S. Pat. No. 2,534,338, issued Dec. 19, 1950.

SUMMARY OF THE INVENTION

The invention provides an apparatus for supporting objects of varied shapes for submersion in a liquid, the apparatus comprising a pair of sheets of elastomeric material, each of the sheets having a perimeter, and frame means for supporting at least a portion of the perimeters of the sheets in generally parallel spaced-apart position such that the sheets will hold an object placed therebetween.

The invention also provides a method for submerging objects of varied shapes in a liquid, the method comprising the steps of placing an object between a pair of sheets of elastomeric material, each of the sheets having a perimeter, supporting at least a portion of the perimeters of the sheets in generally parallel spaced-apart position such that the sheets will hold the object placed therebetween, and submerging the sheets and the object in a liquid by applying a submerging force to the sheets of elastomeric material such that the resulting stress on the object is distributed across the object by the sheets of elastromeric material.

In one embodiment, the method further comprises the step of removing the sheets and the object from the liquid by applying a lifting force to the sheets such that the resulting stress on the object is distributed across the object by the sheets of elastomeric material.

In one embodiment, each of the sheets includes a plurality of holes therein for allowing liquid to flow therethrough.

In one embodiment, at least one of the sheets includes a hole therein for allowing a portion of the object to extend therethrough.

In one embodiment, the frame means comprises a first metal frame secured around the perimeter of one of the sheets, a second metal frame secured around the perimeter of the other of the sheets, and means for supporting the first and second frames in a generally parallel spaced-apart position.

In one embodiment, the means for supporting the frames includes means for clampingly engaging the frames.

A principal feature of the invention is to provide an apparatus for supporting foam mold patterns for submersion in a liquid, which apparatus will generally evenly distribute the stress from the submerging and lifting forces evenly across the pattern.

Another principal feature of the invention is the capability of the apparatus to support foam mold patterns of varied shapes and sizes.

Other features and advantages of the invention will become apparent to those skilled in the art upon review of the following detailed description, claims, and drawings.

DESCRIPTION OF THE DRAWINGS

FIG. 1 is a perspective view of an apparatus embodying the invention.

FIG. 2 is an enlarged, fragmentary side view of the apparatus shown in FIG. 1.

FIG. 3 is an enlarged, fragmentary side view of an alternative construction of the means for supporting the frames.

FIG. 4 is a perspective view of mechanical means for submerging the apparatus in liquid.

Before explaining one embodiment of the invention in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

Illustrated in the drawings is an apparatus 10 for supporting objects of varied shapes for submersion in a liquid. While the apparatus 10 will hereinafter be described as being for supporting foam mold patterns for submersion in a refractory coating liquid, it should be understood that the apparatus 10 can be used for supporting any relatively light object for submersion in a liquid.

The apparatus 10 includes a pair of sheets 12 and 14 of elastomeric material. In the preferred embodiment, the sheets 12 and 14 are made of gum rubber, although other suitable elastomeric materials could be used. In the illustrated construction, the sheets 12 and 14 are generally rectangular, but they could have other shapes.

The apparatus 10 also comprises frame means 16 for supporting at least a portion of the perimeters of the sheets 12 and 14 in a generally parallel spaced-apart position such that the sheets 12 and 14 will hold an object placed therebetween. While other suitable means could be employed, in the illustrated construction, the frame means 16 comprises a first metal frame 18 secured around the perimeter of the upper sheet 12, and a second metal frame 20 secured around the perimeter of the lower sheet 14. In the preferred embodiment, the metal frames 18 and 20 are constructed of elongated metal tubes joined at the ends.

The gum rubber sheets 12 and 14 can be secured to the metal frames 18 and 20 by any suitable means. In the illustrated construction, as best shown in FIG. 2, the sheets are secured to the frames by means including a bead around the perimeters of the sheets, with the sheets extending through slots in the tubular frames.

The frame means 16 also comprises means 22 for supporting the first and second frames 18 and 20 in a generally parallel spaced-apart position. While various suitable supporting means could be employed, in the preferred embodiment, the means 22 comprises four rigid C-clamps 24 each engaging a pair of opposed corners of the two frames 18 and 20. It should be noted that the means 22 could alternatively comprise, for example, clamps 26 such as the one illustrated in FIG. 3.

Furthermore, the means 22 for supporting the first and second frames 18 and 20 need not be clamping means, but could be any suitable means for supporting the first and second frames 18 and 20 in a generally parallel spaced-apart position.

Also shown in the drawings is a foam mold pattern 28 being supported by the apparatus 10. For ease of illustration, the foam mold pattern 28 is shown as a generally rectangular solid having a foam sprue 30 extending therefrom. However, it should be understood that the foam mold patterns for which the apparatus is especially designed could include a cluster of foam patterns and a complicated runner system.

As shown in FIG. 1, each of the sheets 12 and 14 includes, in the preferred embodiment, a plurality of holes 32 therein for allowing liquid to flow therethrough. These holes 32 allow the refractory coating liquid in which the foam pattern 28 is to be submerged to contact a greater portion of the surface area of the foam pattern 28. Even so, the gum rubber sheets 12 and 14 will probably still prevent a portion of the surface area of the foam pattern 28 from being contacted by the liquid. However, when the foam pattern 28 is removed from the apparatus 10, the liquid on the pattern 28 will migrate over the areas previously engaged by the rubber sheets 12 and 14.

As best shown in FIG. 1, the upper sheet 12 includes a hole 34 therein for allowing the sprue 30 of the mold pattern 28 to extend therethrough. In alternative embodiments, one or both of the sheets 12 and 14 could include any number of holes therein for allowing portions of the foam pattern to extend therethrough. The desirability of such holes would depend on the particular shape of the foam pattern to be supported.

In use, the foam pattern 28 is placed between the sheets 12 and 14 with the sprue 30 of the foam pattern 28 extending through the hole 34 in the upper sheet 12, and then the frames 18 and 20 are clamped together by the clamps 24. The frames 18 and 20 are clamped together so that the foam pattern 28 is held in place between the sheets 12 and 14, but so as to avoid forcing the sheets 12 and 14 tightly against the foam pattern 28.

The apparatus 10 is then submerged in a refractory coating liquid. Any suitable means can be employed for holding the apparatus 10 and submerging it in the liquid. For instance, this could be done manually. Illustrated in FIG. 4 is mechanical means 40 for submerging the apparatus 10 in a tank of refractory coating liquid. The means 40 includes a hydraulic cylinder-piston assembly 42 and support structure 44 connecting the piston rod to the apparatus 10. The support structure 44 includes connecting members 46 each having an axial bore 48 therein. The bore 48 receives a pin 50 extending upwardly from a corner of the upper frame 18, and the pin 50 is secured to the connecting member 46 by a cotter pin 52, as best shown in FIG. 2.

When the apparatus 10 is submerged in the liquid, the submerging force is transmitted to the foam pattern 28 via the first frame 18 and the upper sheet 12. Because the upper sheet 12 stretches easily, it "wraps" itself around the upper portion of the foam pattern 28, thereby distributing the stress from the submerging force across the pattern 28.

When the apparatus 10 is removed from the liquid, the lifting force is transmitted to the foam pattern 28 via the second frame 20 and the lower sheet 14. In this case the lower sheet 14 "wraps" itself around the lower portion of the pattern 28, thereby distributing the stress from the lifting force across the pattern 28.

After the apparatus 10 is removed from the liquid, the clamps 24 are removed from the frames 18 and 20, and the foam pattern 28 is removed from between the sheets 12 and 14. At this point, the liquid on the foam pattern 28 will migrate over the areas of the pattern 28 that were engaged by the sheets 12 and 14 and were not coated.

Various features of the invention are set forth in the following claims.

I claim:

1. An apparatus for supporting objects of varied shapes for submersion in a liquid, said apparatus comprising a pair of sheets of elastomeric material, each of said sheets having a perimeter, and frame means for supporting at least a portion of said perimeters of said sheets in generally parallel spaced-apart position such that said sheets will hold an object placed therebetween.

2. An apparatus as set forth in claim 1 wherein each of said sheets includes a plurality of holes therein for allowing liquid to flow therethrough.

3. An apparatus as set forth in claim 1 wherein at least one of said sheets includes a hole therein for allowing a portion of the object to extend therethrough.

4. An apparatus as set forth in claim 1 wherein said frame means comprises a first metal frame secured around said perimeter of one of said sheets, a second metal frame secured around said perimeter of the other of said sheets, and means for supporting said first and second frames in a generally parallel spaced-apart position.

5. An apparatus as set forth in claim 4 wherein said means for supporting said frames includes means for clampingly engaging said frames.

6. An apparatus for supporting objects of varied shapes for submersion in a liquid, said apparatus comprising a pair of sheets of elastomeric material, each of said sheets having a perimeter and including a plurality of holes therein for allowing liquid to flow therethrough, and at least one of said sheets including a hole therein for allowing a portion of the object to extend therethrough, and frame means for supporting at least a portion of said perimeters of said sheets in generally parallel spaced-apart position such that said sheets will hold an object placed therebetween, said frame means comprising a first metal frame secured around said perimeter of one of said sheets, a second metal frame secured around said perimeter of the other of said sheets, and means for supporting said first and second frames in a generally parallel spaced-apart position, said means for supporting said frames including means for clampingly engaging said frames.

7. A method for submerging objects of varied shapes in a liquid, said method comprising the steps of placing an object between a pair of sheets of elastomeric material, each of the sheets having a perimeter, supporting at least a portion of the perimeters of the sheets in generally parallel spaced-apart position such that the sheets will hold the object placed therebetween, and submerging the sheets and the object in a liquid by applying a submerging force to the sheets of elastomeric material such that the resulting stress on the object is distributed across the object by the sheets of elastomeric material.

8. A method as set forth in claim 7 and further comprising the step of removing the sheets and the object from the liquid by applying a lifting force to the sheets such that the resulting stress on the object is distributed across the object by the sheets of elastomeric material.

9. A method as set forth in claim 7 and further comprising the step of providing a plurality of holes in each of the sheets for allowing liquid to flow therethrough.

10. A method as set forth in claim 7 and further comprising the step of providing a hole in at least one of the sheets for allowing a portion of the object to extend therethrough.

11. A method as set forth in claim 7 wherein said supporting step further includes the step of providing a first metal frame secured around a perimeter of one of the sheets, a second metal frame secured around the perimeter of the other of the sheets, and means for supporting the first and second frames in a generally parallel spaced-apart position.

12. A method as set forth in claim 11 and further comprising the step of providing a plurality of holes in each of the sheets for allowing liquid to flow therethrough.

13. A method as set forth in claim 12 and further comprising the step of providing a hole in at least one of the sheets for allowing a portion of the object to extend therethrough.

14. A method as set forth in claim 13 and further comprising the step of removing the sheets and the object from the liquid by applying a lifting force to the sheets such that the resulting stress on the object is distributed across the object by the sheets of elastomeric material.

15. An apparatus for supporting objects of varied shapes for submersion in a liquid, said apparatus comprising a sheet of elastomeric material, said sheet having a perimeter, a member, and frame means for supporting at least a portion of said perimeter of said sheet and for supporting said member in spaced relation to said sheet such that said sheet engages an object to hold the object between said sheet and said member.

16. An apparatus as set forth in claim 15 wherein said sheet includes a plurality of holes therein for allowing liquid to flow therethrough.

17. An apparatus as set forth in claim 15 wherein said sheet includes a hole therein for allowing a portion of the object to extend therethrough.

18. An apparatus as set forth in claim 15 wherein said frame means comprises a first metal frame secured around said perimeter of said sheets, a second metal frame supporting said member, and means for supporting said first and second frames in a generally parallel spaced-apart position.

19. An apparatus as set forth in claim 18 wherein said means for supporting said frames includes means for clampingly engaging said frames.

* * * * *